US 6,677,054 B1

(12) United States Patent
Hermann et al.

(10) Patent No.: US 6,677,054 B1
(45) Date of Patent: Jan. 13, 2004

(54) DEVICE FOR INTEGRALLY JOINING A METAL BLOCK THAT CAN BE MADE UP OF PLATES

(75) Inventors: Jakob Hermann, Dettenhausen (DE); Eckehart Schulze, Weissach (DE)

(73) Assignee: Hartmann & Laemmle GmbH & Co. KG (DE)

( * ) Notice: Subject to any disclaimer, the term of this patent is extended or adjusted under 35 U.S.C. 154(b) by 0 days.

(21) Appl. No.: 10/019,806

(22) PCT Filed: Jun. 30, 2000

(86) PCT No.: PCT/EP00/06141

§ 371 (c)(1),
(2), (4) Date: Dec. 24, 2001

(87) PCT Pub. No.: WO01/02119

PCT Pub. Date: Jan. 11, 2001

(30) Foreign Application Priority Data

Jun. 30, 1999 (DE) .......................... 199 29 828

(51) Int. Cl.⁷ .......................... B32B 15/01; B23K 3/00
(52) U.S. Cl. .................. 428/636; 228/190; 228/258; 228/44.3
(58) Field of Search .................. 428/636, 638, 428/577, 594, 615; 228/190, 258, 44.3; 29/281.1

(56) References Cited

U.S. PATENT DOCUMENTS

| | | | | |
|---|---|---|---|---|
| 2,479,325 A | * | 8/1949 | Domenico | .................. 228/190 |
| 3,119,418 A | * | 1/1964 | Rayniak | ...................... 30/387 |
| 3,327,161 A | * | 6/1967 | Kakizawa | ................ 315/39.75 |
| 3,330,027 A | * | 7/1967 | Kernander | ............... 228/180.1 |
| 3,390,447 A | * | 7/1968 | Mears | .......................... 228/174 |
| 3,441,996 A | * | 5/1969 | Boothe | .................... 29/890.09 |
| 4,071,730 A | * | 1/1978 | Bassler | .................... 219/85.15 |
| 5,192,623 A | * | 3/1993 | Gewelber | .................... 428/593 |
| 5,983,757 A | * | 11/1999 | Blise et al. | ................ 81/57.39 |
| 6,305,418 B1 | * | 10/2001 | Schulze | ................ 137/625.23 |

FOREIGN PATENT DOCUMENTS

DE           19629217 A1  *  1/1998

* cited by examiner

Primary Examiner—John J. Zimmerman
(74) Attorney, Agent, or Firm—Pendorf & Cutliff (57) ABSTRACT

A device for integrally joining a metal block (11') that can consist of a number of plates, by hard-soldering or brazing. The hard-solder provides a connection covering a large surface and with a minimal thickness in solder gaps ($17_j$; j=1, 2, . . . , n−1) located between adjacent segment plates ($12_i$; i=1, 2, . . . , n). At least one capillary solder inflow path (14) is provided. Said solder inflow path starts at a solder depot containing a supply of hard solder or braze material (42), which melts as the stack (11) of plates is heated. The melted solder material flows directly to the individual, also capillary solder gaps ($17_j$; j=1, 2, . . . , n−1) via said solder inflow path, the solder gaps being provided between surfaces of the segment plates ($12_i$) that face towards each other.

24 Claims, 7 Drawing Sheets

DEVICE FOR INTEGRALLY JOINING A METAL BLOCK THAT CAN BE MADE UP OF PLATES

BACKGROUND OF THE INVENTION

1. Field of the Invention

The invention concerns a device for the integral joining of a metal block which can be made up of plates, by hard soldering or brazing, wherein the hard solder or braze provides in solder gaps located between adjacent segment plates a large surface area junction with minimal thickness.

2. Description of the Related Art

This type of device is known from DE 196 29 217 A1 in connection with a hydraulic valve, both for the housing as well as for the piston.

In the known device the solvent material as provided in depository spaces which are closed off after the segment plates have been assembled into the configuration into which the block is to be formed by brazing. The depository spaces are formed by aligned circular holes of the same diameter extending through adjacent contacting segment plates, the depository spaces being closed off on their ends by segment plates without holes. They must have relatively thick cross sections, in order to be able to take up sufficient soldering material. In general such solder depository spaces do not extend over the entire length of the plate device viewed perpendicular to the solder gaps, but only over several solder gaps, and there are multiple solder depository spaces provided offset over the length of the stack, so that overall all solder gaps can be provided with liquid solder.

It has been found, without taking into consideration of the fundamental suitability of the known device for producing surface "welded throughout" and therewith pressure resistant metal blocks, that a substantial investment is required in testing, in order to determine the size of the depository space and arrangement thereof within the metal blocks to be produced by brazing which, in a series production, results in a reproducible good quality, that is, results in a solder connection over the entire area of the contact surfaces. There is a further consideration that the blocks must be so orientated for the soldering process that the tubular shaped depository spaces must run exactly horizontally, so that the molten solder material distributes evenly over the length of the depository space and can reach the solder gaps, which must be respectively supplied via the solder depositories. The thus "vertical" orientation of the solder gaps or, as the case may be, segment plates which must be aligned along their narrow outer border surfaces, requires fixation means in order to securely hold the plates together in the orientation necessary for joining, before they are soldered to each other.

SUMMARY OF THE INVENTION

It is thus the task of the invention, of improving a device of the above described type in such a manner, that independent of the orientation of the solder gaps a large surface area brazing of adjacent segment plates of a multi-layer of metal block is reliably achievable over the entire common contact surface thereof and the device can be achieved with simple technical means.

This task is solved in accordance with the basic concept of the invention in that at least one capillary solder flow path is provided which starts at a solder depository containing a supply of brace material, which melts upon heating of the stack of plates, via which flow path the melted solder material flows directly to the individual capillary solder gaps provided between the facing surfaces of the segment plates.

In accordance therewith, the capillary effect—which makes the soldering possible—is also used for the transport of solder material to the individual solder gaps and thereby makes it possible for the solder, obviously within the boundaries within which the capillary effect is effective, to practically simultaneously supply all the solder gaps in the sense of a "hydraulic" parallel circuit and to provide an even supply—respectively depending upon need—of solder material, in which capillaries the solder can then, again on the basis of the capillary effect, spread out and perfuse the segment plates over a large surface area. In the solder flow path liquid solder material continues to flow until the solder gaps of the metal block are filled and the capillary network formed by the flow path and the solder gaps—wherein high adhesive forces occur between the gap walls and the solvent material—are filled—and at the same time "fully wetted"—, wherein it can be insured by the appropriate limitation of the available supply of solder material, that the large volume hollow spaces provided within the metal block are not filled, since on the basis of the capillary action in the very narrow gaps first only the "narrow" solder gaps are filled, into which the solder material is evenly drawn, before a supplying or pooling of solder material can occur in other "non capillary" hollow spaces.

When employing the inventive device no exhaustive testing need be carried in order to determine an optimal arrangement of solder supply channels to enable the setting up of a series production; rather, it is sufficient to supply solder material in sufficient amount so that the solder gaps of the metal blocks inclusive of the solvent supply paths can be completely filled, which is easily possible using mathematics or a computer. The inventive device can be realized using simple designed, premanufactured parts with minimal technical investment.

Beginning with a rather conventional design of the metal block, in which the outer narrow surfaces of the segment plates are in alignment with each other, and with their large surface areas running coplanar—at least in areas—so that a capillary solder flow path can be provided in such surface areas, this can be realized in simple manner for example by means of a profile rod laid against the outside of the metal block, which profile rod crosses over the solder gaps of the metal block, for example with linear contact.

The solder flow paths located at the outer areas of a segment plate stack and running horizontal or vertical can be established by using a predefined design, and accordingly a reliable capillary effect be realized with simple means, in the manner that the segment plates are provided with edge open recesses which align with each other, the edge surfaces running perpendicular to the solder gaps and collectively forming a groove traversing the solder gaps, into which a profile rod is inserted, which borders or defines within the groove at least one acute narrowing closed-edged channel and is held in contact with or covering the groove wall along at least one line crossing the solder gap.

These solder supply paths according to the basic design can be realized in many diverse ways, for which the details, alternatives and specifications which can be used in combination are discussed below. Depending upon the shape of the groove there results therein, in combination with an at least segment-wise cylindrically shaped profile rod, either a contact line along which two wedge-like narrowing capillary gaps connect with each other with continuously narrowing gap (0) and disappearing wedge angle (0), this for example in a case that the cylindrically curved area of the profile rod comes into contact with a planar base surface of the groove, or two contact lines when the groove has a V-shaped cross section, or possibly even three contact lines when a profile rod with a cylindrical surface spanning more than 180° in circumference is introduced in a groove, which has two groove walls parallel to each other, between which a planar groove base extends.

In the case that at least two contact lines result on the basis of the shape of the profile rod and the groove in which it is inserted, the closed edged channel formed by the profile rod and the groove is also suitable as solder depository space for wire or flat bar shaped brace, this in any case when the groove depth is relatively large, that is, in the case of right-angular joining groove boundary surfaces corresponding at least to the curvature radius of the cylinder outer surface of the rod inserted in the groove.

Alternatively to this, the solder supply paths provided outside on the segment plate stack for solder transport to the solder gaps can, according to the characteristics discussed below, also be realized with grooves of relatively shallow depth at the plate sides and with a corresponding basically flat rod shaped profile bodies, which by wedging into or bending over the groove can also confer a suitable pre-fixing of the segment plate stack for the welding process in a welding oven.

In order to provide suitable spaces for receiving solder supply central recesses can be provided within this type of "flat" grooves, which along the outer side are bridged over by a profile bar and thereby are closed off towards the outside. A solder supply path of this design is suitable at least in the case that these are formed running vertically, and/or are provided on vertically or diagonally rising outer surfaces of the metal block which for their part are at right angles or diagonal to the solvent gaps. Alternatively or additionally to a solder supply path running along the outer edge surface of the plate stack, an "inner", that is, a solder supply path bordered by the segment plates themselves, can be realized in the manner, that this is formed by preferably round closed edged openings in the block forming segment plates, the openings aligned with each other, and a profile rod extending through these openings, which profile rod has a shape geometrically similar to the shape of the opening and having a slightly smaller cross sectional area than the area of the opening, and which is in a continuous, line-forming contact with the edges of the openings of the segment plates. For this, a cylindrical rod can be suitable, which has a somewhat smaller diameter than the opening of the segment plates, and with respect to the central longitudinal axis of the opening is provided eccentrically, such that a continuous contact results along one line on the outer surface of the profile rod.

In a preferred design of the device at least one solder supply path is provided, which is formed by round-edged openings in the segment plates aligned with each other and a helical spring or coil extending through the channel formed by these openings, of which the spring coils are in continuous linear contact with each opening edge, wherein it is particularly preferred, when the helical spring is wound on a block, which corresponds to the smallest possible cross section of the—in this case—closed edged capillary solder transport channel.

When at least two solder supply paths are provided, for example in a diametrically opposed arrangement relative to the central axis of the segment plate stack, then these can be used for holding the segment plates in a defined position—aligning—arrangement in the sense of a pre-fixing for the soldering process.

Independent of whether the capillary solder supply path is provided at the outer area of the metal block to be joined by brazing or in the internal area thereof, pocket or funnel shaped solder depository spaces for receiving a solder supply, in communication with the ambient atmosphere, can be provided in such a device, so that molten solder can flow under the influence of gravity to the capillary solder supply path(s).

Solder supply paths as described below are particularly suitable for the edge areas of a metal block comprised of multiple segment plates with right-angled edge areas, and can be produced by simple bending of tongue-shaped plate elements.

By means of a suitable tie rod or by a through-bolt introduced in the joined metal block, it is possible in simple manner to stabilize the metal block against expanding forces, which could result for example by the high hydraulic pressure of the connecting channels extending throughout the metal block.

When closed—"blind"—hollow spaces are provided in the segment plate stack, which are preferably defined by openings of identical cross-section aligned with each other in the "intermediate" segment plates sandwiched between the outermost segment plates, then it is possible in simple manner, as discussed below, to tightly press the segment plates to be joined with each other during the welding and to produce minimal solder gap widths, which result in particularly solid solder connections.

BRIEF DESCRIPTION OF THE DRAWING

Further details of the inventive device can be seen from the following description of special exemplary embodiments on the basis of the figures, wherein with reference to the functional description in the exemplary embodiments also processes are described, which result in a particularly solid joining of the metal block which can be produced in accordance with the inventive device. There is shown.

DETAILED DESCRIPTION OF THE INVENTION

Figure 1:
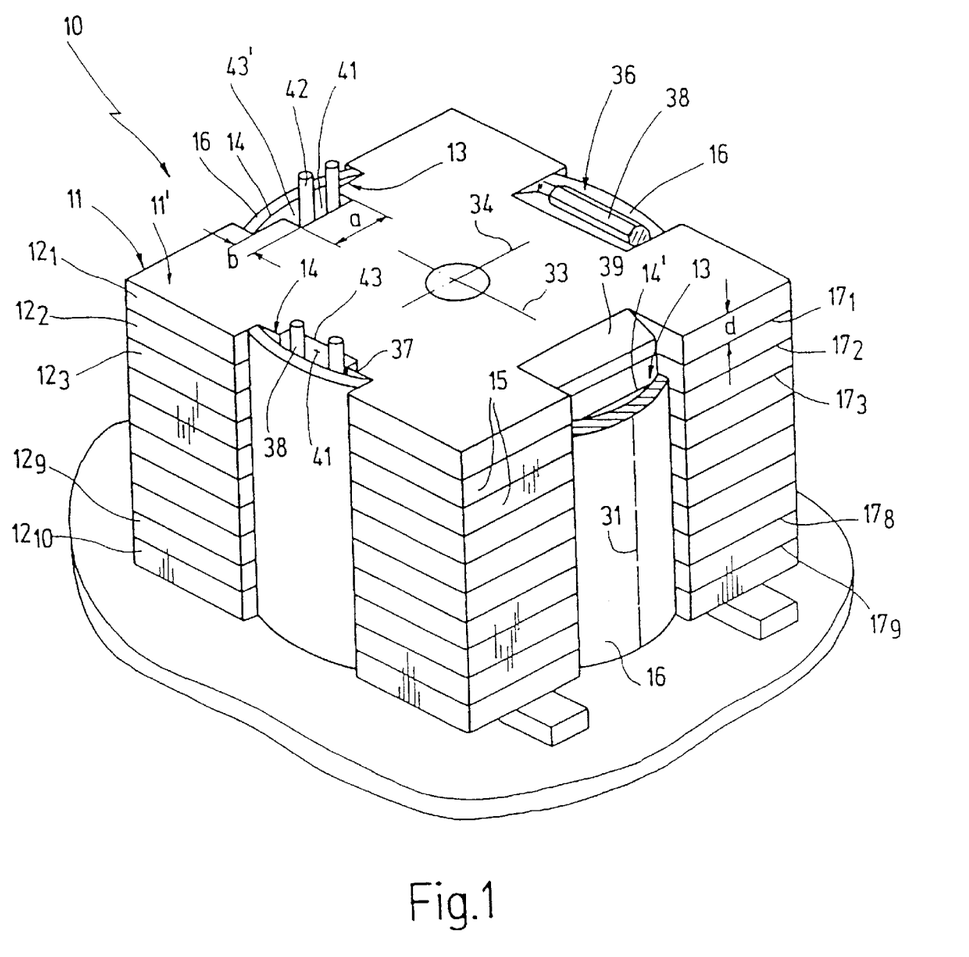
FIG. 1 an inventive device for brazing with four segment plates to be formed into a stack along their outer sides and to be soldered to each other via solder supply paths to form a compact metal block, in perspective, schematic simplified view, FIG. 2 the solder depository area of the solder supply path, in sectional view along one of the vertical middle planes of the device according to FIG. 1, FIG. 3 a section along the plane III—III of FIG. 2, FIG. 4a a further design of a suitable solder supply path of a device according to FIG. 1, in a sectional representation corresponding to the representation in FIG. 2, FIG. 4b a section along the line IVb—IVb of FIG. 4a, FIG. 4c an alternative of the solder supply path according to FIGS. 4a and 4b in a sectional representation corresponding to the sectional representation in FIG. 4b, FIG. 5a a further exemplary design of a solder supply path in a sectional representation corresponding to FIG. 4a along the plane Va—Va of FIG. 5b, FIG. 5b an alternative arrangement of solder supply paths according to FIG. 5a with steel rods used for the systematic orientation—"centering"—of the segment plates in schematic simplified partial top view, FIG. 6a a further design of a solder supply path which is a functional analog to the solder supply paths according to FIGS. 1 through 5b, FIG. 6b a design of a tie rod integrated in the segment plate stack, in a sectional representation corresponding to FIG. 6a, FIG. 6c a detail of a segment plate stack suitable for introduction into a solder oven which can be evacuated and filled with inert gas, for illustration of a solder process which can lead to a particularly high strength or integrity of the soldered metal block, and FIG. 7 a solder supply path realized exclusively by elements of the segment plates, for the corner area of the metal block according to FIG. 1, in schematic simplified perspective partial representation.

The purpose of the device indicated overall with reference number 10 in FIG. 1—which includes a stack 11 of superposed segment plates $12_1$ through $12_{10}$ of steel as well as linear, edge-open grooves 13 of the segment plates including metal profile rods 16 inserted for formation of solder supply paths 14—is the production in a braze process of a materially joined connection of the segment plates $12_1$ through $12_{10}$ to each other with a highly rigid, uniform, one-piece metal block 11', of which the outer shape corresponds essentially to that of the stack of plates 11. For the metal block 11', which essentially for purpose of explanation and without limitation thereto is presumed to be intended for use as a hydraulic connection block, via which for example the P-high pressure outlet and the T-return flow connection of a not shown hydraulic pressure supply assembly with appropriate P- and T-connections of the, for simplification of explanation purpose not shown hydraulic valves, respectively can be joined, which are mounted on a hydraulic connection block device lying opposite to the supply connections, wherein the functionally defined hydraulic connection channels running within the connection block are formed by closed-edged openings in the segment plates $12_1$ through $12_{10}$, which form, by the overlapping of their thin cross sections, the respective communicating connections between the supply connections and the valve connections.

In the case of the illustrative embodiment selected for explanation purposes it is presumed that the segment plates $12_1$ through $12_{10}$, with the exception of the grooves 13, have square edges, with edge lengths of 20 cm and a thickness d of 10 mm, and that they are stacked upon each other, with their surfaces having the larger surface area as boundary surfaces, to form the stack 11, in such a manner that their narrow side boundary surfaces 15 run coplanar along the four side boundary surfaces of the stack 11, so that the stack 11 is bordered by right angled, planar, vertical boundary surfaces.

Figure 2:
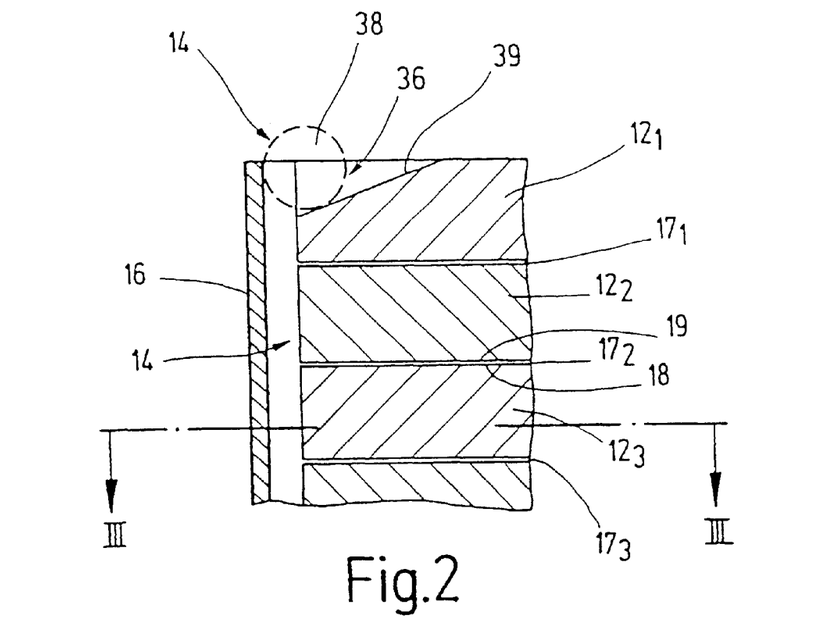

In order to achieve optimal rigidity of the metal block 11' to be produced by braze process—"one piece" or "unitary"—, it is necessary to completely fill with solder the solder gaps $17_j$ (j=1 through n–1), which are defined between the segment plates $12_i$ (i=1 through n; n=10) by the large bordering surfaces, that is, in the total large surface overlapping area of the plate bordering surfaces, between the facing surfaces of the respective lower plate bordering surface 18 and the adjacent upper bordering surface 19 (FIG. 2).

The solder gaps $17_1$ through $17_9$ have, so long as the segment plates $12_1$ through $12_{10}$ are still "loosely" stacked upon each other, because of their respective only point-shaped contact to each other, still a sufficient "vertical" gap or narrow width, such that the molten solder can evenly distribute itself, that is, surface wise, within this gap on the basis of the capillary action. This also applies in the case that the segment plates $12_1$ through $12_{10}$ are pressed against each other with higher pressures then would result due only to their own weight, for example, by an additional weight placed upon the uppermost segment plate $12_1$, so long as the thereby always achievable narrowing of the gap results in an advantageous increase in the capillary action which causes a drawing in of solder into the solder gaps $17_1$ through $17_9$, which increases with decreasing gap width. This effect is also utilized in the solder supply paths 14 provided for supplying of solder material to the solder gaps $17_1$ through $17_9$.

Figure 3:
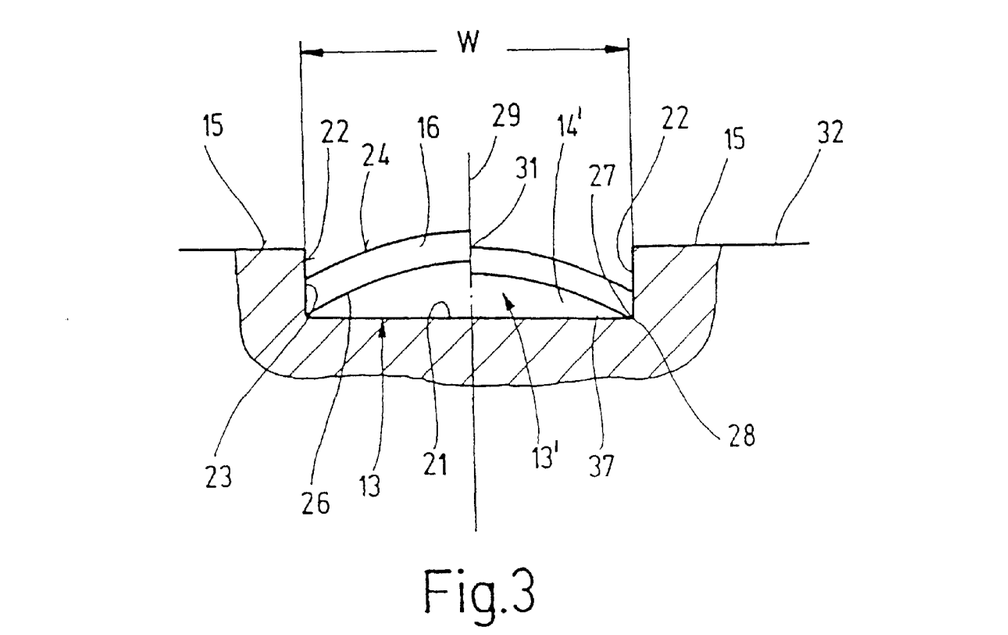

For illustrating possible designs of the supply paths 14 useable in the device 10, first reference is made to the solder supply path 14 illustrated in the right part of the perspective representation of FIG. 1 as well as the sectional representation of FIGS. 2 and 3:

The segment plates $12_1$ through $12_{10}$ are provided, in the central area of their narrow side surfaces 15, with edge-open groove recesses 13, which respectively have the same flat right angled narrow cross section. They are so arranged, that when the segment plates $12_1$ through $12_{10}$ are in the "aligned" position for the joining of the metal block 11' the groove base surfaces 21 (FIG. 3) and the groove side wall surfaces 22 of the groove recesses 13 align with each other, so that in this configuration of the metal block 11' a groove 13' extending over the height of the metal block 11' results, with which all of the solder gaps $17_1$ through $17_9$ are in communication.

In this groove 13' a flat-curved profile bar 16, preferably constructed of the same material as the segment plates $12_1$ through $12_{10}$, is seated, which has the shape of a flat curved segment of a pipe or cylinder outer surface extending over an arc of 20°, of which the narrow side bordering surfaces 23, between which the convex curved outer surface 24 and a concave curved inner surface 26 of the profile bar 16 extend, run parallel to each other in the starting condition of the profile bar 16 via which these not yet rigidly connected segment plates are connected. The profile bar 16 is so designed, that in its starting condition it can be so inserted or introduced into the groove 13', that a contact is established between its narrow longitudinal border surfaces 23 and the groove side wall surfaces 22 of the groove recess 13 of the segment plates $12_1$ through $12_{10}$, and so that the inner corner edges 27 of the profile bar 16 contact the groove corner edge 28, along which the shaft flank or side walls 22 of the groove recesses 13 join the groove base surfaces 21. This starting condition is represented in the left part of FIG. 3. In this starting condition of the metal profile bar 16, the convex bowed outer surface 24 of the metal profile bar 16 projects somewhat out of the groove 13' from the region extending on both sides of the groove 13 of the narrow side surface 15 of the segment plates $12_1$ through $12_{10}$. The profile bar 16, which in its starting condition is still easily slideable in the groove 13 is clamped into the groove 13' by depressing its central region in the direction towards the groove base 21, whereby it clamps form-fittingly with its inner edges 27 in the edge areas 28 of the groove recess 13 for force-form locking engagement of the segment plate material, and thereby is fixed in the groove 13'. The thickness of the profile bar 16, its curvature, the depth of the groove 13 and its width w measured parallel to the groove base 21 are dimensioned relative to each other, so that the profile bar 16 can be securely fixed in the groove 13 when it is press formed into the idealized shape shown in the right part of FIG. 3, in which the outer surface line 31 of the profile bar 16 running along the longitudinal central plane or area 29 of the groove 13' is in the plane 32 of the narrow side flanks or surfaces 15 of the segment plates $12_1$ through $12_{10}$ (FIG. 3).

In the illustrated embodiment according to FIG. 1 selected for explanation, which has four solder supply paths 14 with profile bars 16 clamped in the grooves 13', these solder supply paths in pairwise symmetrical arrangement along "vertical" central planes 33 and 34 of the metal block 11' running at right angles to each other, there is achieved by the clamping of this profile bar 16 into the groove 13' also the prefixing of the segment plates $12_1$ through $12_{10}$ necessary for the soldering of the segment plates $12_1$ through $12_{10}$ to each other in the "oriented" configuration is achieved.

Departing from the representation of the curvatures of the outer and inner border surfaces of the profile bar 16 in the configuration clamped in the groove 13' selected for illustrative purposes, the "vertical" gap 14' of the solder supply path 14, measured perpendicular to the groove base 21, can have a consistent largest thickness gap width of always 0.2 to 0.3 mm, so that molten solder material, which flows in for example from above from the solder depository space 36 in the gap 14', on the basis of the capillary action of the gap 14' even when this is to be filled during the solder process, cannot exit from below out of the gap 14' but rather on the basis of the increased capillary action of the gap 14' spreads out in the corner edge near regions 37, in which the gap width according to the idealized representation of FIG. 3 decreases towards "0" towards the corner edges 27 of the profile bar and the edge corners 28 of the groove recess 13, is drawn quantitatively into the solder gaps $17_1$ through $17_9$ by capillary effect from the supply gap 14', and spreads within the solder gap, which wet these bordering plate surfaces 18 and 19.

In the device 10 represented in FIG. 1 two solder depository spaces 36 are provided for cylindrical rod shaped solder material pieces 38 in such a manner, that the uppermost segment plates $12_1$ of the plate stack 11, which have a diagonal chamfer surface 39 narrowing towards the gap 14', extending between the groove flanks 22 of the groove 13', which extends over a part of the thickness of the uppermost segment plate and together with the upper edge of the profile rod 16 forms a recess which in cross section is flat wedge shaped, in which the solder material rod 38 in close approximately to the solder supply space is securely deposited.

The solder supply path 14 represented as an example in the left part of FIG. 1 differs from that shown in the right part of FIG. 1 and in the cross section in the solder supply path shown in FIG. 2 essentially by the design of the solder storage space 41, which is essentially designed as pocket shaped insertion compartment, in which the solder material supply rod 42 is inserted "from above" into the illustrated device.

The flat pocket shaped deposit spaces 41 are bordered by flat—viewed from the narrow cross section, respectively square shaped—each other aligned, groove steps 43 of at least some of the segment plates $12_1$ through $12_i$ which, viewed from the uppermost segment plate $12_1$, are immediately adjacent each other. These groove steps 43 are formed symmetrically with respect to the respective cross sectional planes 33 or as the case may be 34 of the plate stack 11, in which also the profile bar covered groove recesses 30 are formed symmetrically, of which the flank separation is however significantly greater than that of the groove steps 43. The groove flank width a of the groove 43 bordered overall by the groove step 43' (FIG. 1), and the perpendicular thereto groove base depth b, are so dimensioned or designed, that a capillary action suitable for up take of the solder supply into the solder gap can occur in the insertion pocket for the solder wire forming groove 43' considered by itself. In order to prevent a flowing-out of molten solder material out of the "pocket"-groove 43', this is closed off at the bottom. This closure is achieved in the illustrative embodiment shown in FIG. 1 thereby, that the lowermost segment plate $12_{10}$ of the segment plate stack 11 is not provided with a groove 43' continuing groove shaped recess. In the solder supply path 14 provided with the insertion groove 43' as deposit space for solder material 38 there occurs, in the case that the solder material 38 rapidly melts and collects first at the lower part of the pocket shaped solder deposit space 41, a supply of solder to the thereabove situated solder gaps $17_i$ (i=1 through 9) through $17_1$ by the capillary action of the, on both sides of the pocket groove 43' provided, wedge shaped acute angled inner edge area 37 of the groove 14' forming together with the profile rod 16 overall the solder supply path, in which the molten solder material 38 can climb against gravity up to the uppermost solder gap $17_1$, of course under the assumption, that the plate stack 11 overall is not to high. Otherwise, there must be provided in the vertical direction overlapping solder supply paths, which are formed or designed analogously to the otherwise described solder supply paths 14.

Figure 7:
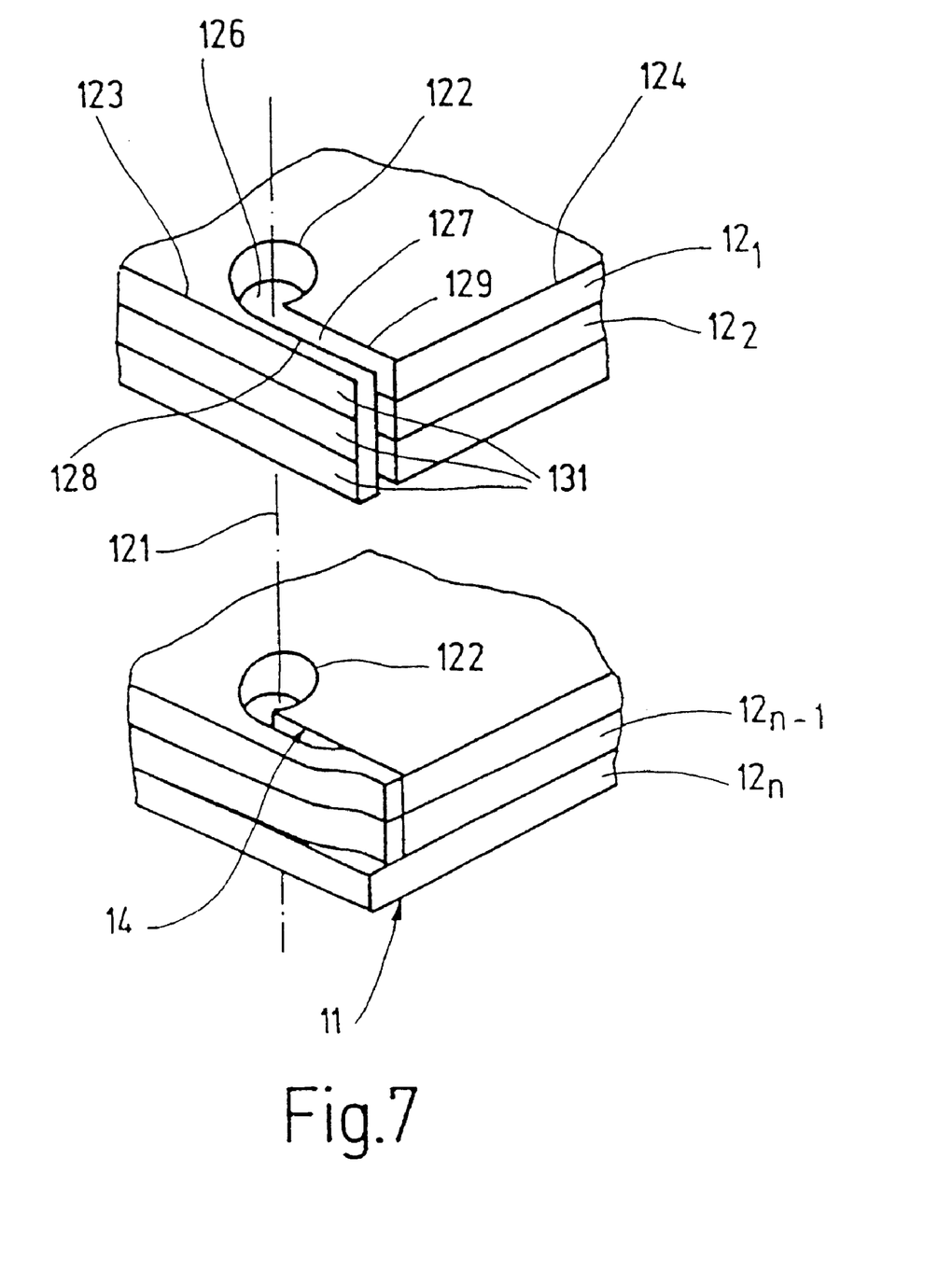

The solder supply path 14 shown in FIG. 7 is suitable for provision in the corner areas of the segment plate stack 11 and is bordered exclusively by elements of the segment plates $12_i$. For explanatory purposes it is presumed that the plate stack 11 has the same outer shape as explained on the basis of FIG. 1.

With the exception of the lowermost segment plate $12_{10}$ the segment plates $12_i$ are provided with round edged openings 122 near the corners or edges, extending coaxially relative to a common central longitudinal axis 121 which extends perpendicular to the solder gaps $17_j$, of which the cylinder wall shaped edges of the opening are aligned with each other. These openings 122 have a sufficient diameter to receive the necessary supply of solder material. The distance of the common central longitudinal axis 121 of the plate openings 122 from an outer edge of the segment plates $12_1$ which, in accordance with the representation of FIG. 7 is to the left, is 1 to 2 mm larger than the diameter of the round openings 122. The distance of the central longitudinal axis 121 from the other edge 122, which in the illustration according to FIG. 7 is on the right, which runs at right angles to the "left" edge 123, has a value, which corresponds to the double or triple of the diameter of the openings 122 aligned with each other. The openings define an upwardly open channel 126, which on its lower side is blocked or closed by the lowermost segment plate $12_{10}$, which extends through every other segment plate $12_1$ through $12_9$ and which serves as the depository space for the rod shaped braze material. From the channel 126 defining openings 122 there extend slits 127, of which the slit side walls 128 and 129 in the non-deformed condition of the segment plates $12_1$ through $12_9$, which is shown in the upper part of FIG. 7, extend parallel to the respective plate outer edge 123, of which the central axis 121 has the smaller distance from the plate openings 122. The width of the slits 127 measured at right angles to the slit side walls 128 and 129 have a typical value of between 0.5 mm and 1.5 mm which is small in comparison to the diameter of the openings 122. The outer, edge-near slit side walls 128 connect flat—"tangential"—to the walls of the openings 122, and the inner slit side walls 129 at an acute angle. In the non-deformed starting condition of the segment plates $12_i$ shown in the upper part of FIG. 7, the slits 127 are edge-open and bordered on the outer side, that is, in the edge-near area, by thin walled tongue elements 131. By pressing the free end segments of the tongue elements 131, which on a basis of their minimal thickness and their relatively large length are easily bendable and are deformable non-elastically and form-retentive, on the inner slit side walls 128 there are produced towards outwards wedge-shaped narrowing, generally closed gaps, as shown in the lower part of FIG. 7, which overall are in communication with the solder depository channel 126, and form capillary solder supply paths 14, over which molten solder flows to the various solder gaps $17_1$ through $17_9$.

Figures 4A, 4B:
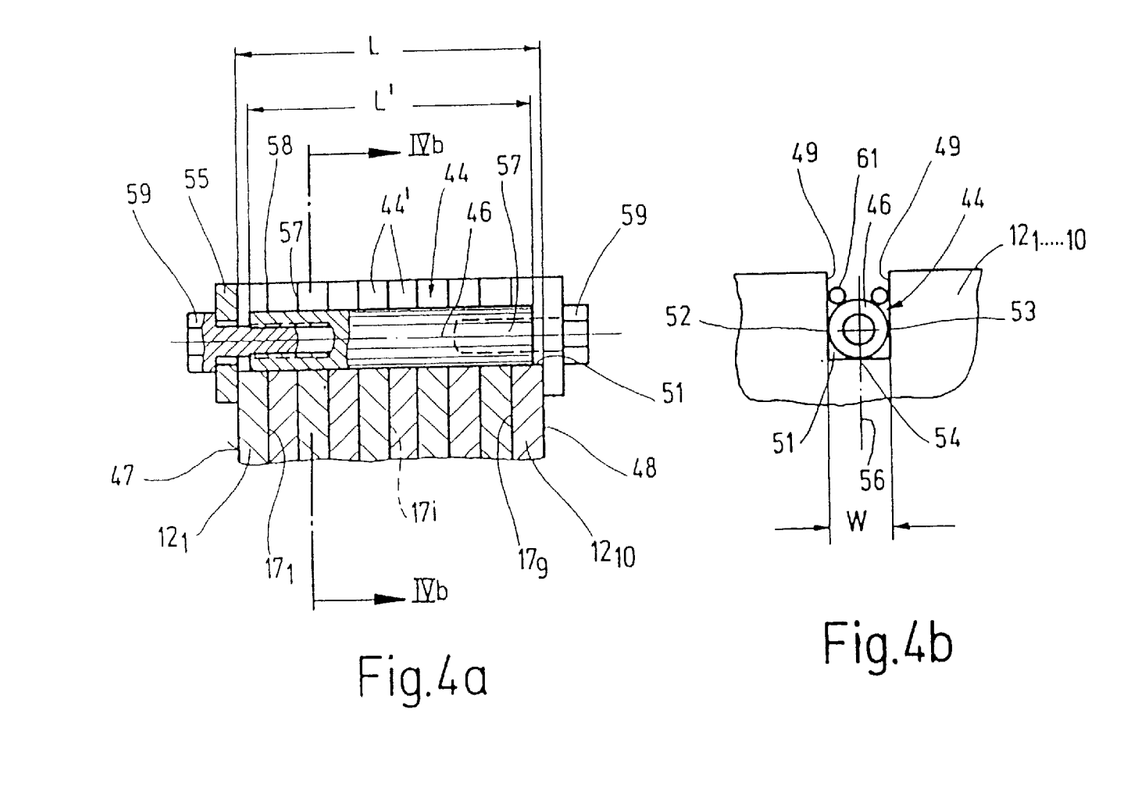

For explanation of a further possible design of solder supply paths wherein molten solder is distributed, using a capillary effect, to the individual solder gaps $17_i$ (i=1 through n) of a metal block 11' comprised of segment plates $12_j$ (j=1 through n+1) which is joined by brazing, reference is now made to FIGS. 4a and 4b.

The stack of plates 11 is based upon an external cubic or rectangular, overall square or parallelepiped block-shaped design with essentially planar external surfaces, analogous to the stack of plates shown in FIG. 1. For the purpose of explanation it is assumed that this stack of plates 11 is introduced into a soldering oven, in which the soldering process occurs, with a vertical orientation of the solder gaps $17_i$.

The solder supply path 14 according to FIGS. 4a and 4b is formed, similarly to the solder supply paths 14 according to FIG. 1, by an edge-open groove 44 and a profile rod 46 seated therein.

The groove 44 extends over the entire "horizontal" length L of the segment plate stack 11, measured between the planar quadratic outer surfaces 47 or as the case may be 48 of the end segment plates $12_1$ and $12_{10}$, which essentially equals the sum of the thicknesses d of the segment plates $12_1$ through $12_{10}$. The solder gaps $17_1$ through $17_9$, which are produced by the flush contacting segment plates $12_1$ through $12_{10}$, do not measurably contribute to the geometric dimension of the stack of plates 11.

The groove 44 is formed by each other superposed edge open, right angled when viewed in cross section, edge recesses 44' of the segment plates $12_1$ through $12_{10}$, wherein the side wall surfaces 49 and the groove base surface 51 of the groove recess 44' respectively join each other. The depth of the groove 44 measured perpendicular to the groove base is approximately 50% larger than the narrow width w measured between the side wall surfaces 49 of the groove 44. The profile rod 46 seated in the groove 44 has the shaped of a cylindrical rod, of which the diameter corresponds to the narrow width of the groove 44, so that when the cylindrical rod 46 is seated in the groove 44, contact with the side walls of the groove 44 is produced at least along two outer surface lines 52 and 53 of the cylindrical rod 46, and in certain cases when the cylindrical rod 46 also lies against the groove base 51, contact as made along a further outer surface line 54 which extends along a central plane 56 running perpendicular to the groove base of the groove 44.

The length L' of the rod 46, in the exemplary devices selected for explanation, in which the collective segment plates $12_1$ through $12_{10}$ have the same thickness d, is smaller by one half of this thickness d than the horizontal of the stack of plates 11, that is, it is so selected, that in each of the possible arrangements of within the groove 44 the contact line 52 and 53 running along the outer surface of the profile rod, with which the profile rod is in linear contact with the side wall surfaces 49 of the groove 44 and in certain cases also the outer surface line 54 along which the profile rod lies against the groove base 51 of the groove 44, it crosses over each solder gap $17_1$ through $17_9$ and thereby insures "capillary" contact of the groove internal space with the solder gaps $17_1$ through $17_9$ between the rod 46 and at least the groove side walls 49. The rod 46 is provided on its end segments with axial threaded boreholes 57, into which screws 58 can be screwed, of which the heads 59 are supported against the outer side of the anchor plates 55, which for their part are already supported against the outer surfaces 47 and 48 of the outer segment plates $12_1$ or as the case maybe $12_{10}$ in their areas immediately surrounding the groove openings.

In the design of the solder supply path 14 represented in FIGS. 4a and 4b with upwards open groove 44, wire shaped solder stock pieces 61 can be introduced into the groove space remaining above the cylindrical rod 46, as illustrated in FIG. 4b.

Figure 4C:
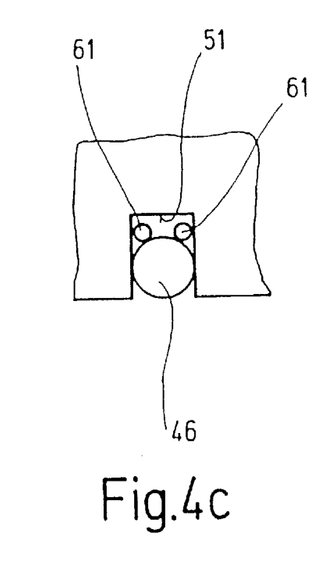

In the case that the solder supply path is on the lower or bottom side of the stack of plates 11, that is, arranged such that the opening of the groove 44 faces downwards, then the round profile rod 46 is force fittingly fixed by means of the anchor screws 58 preferably in the position shown in FIG. 4c, and the groove inner space remaining between the groove base 51 and the profile rod 46 can be used for receiving solder stock pieces 61.

Solder supply paths 14 with the design and arrangement shown in FIGS. 4a through 4c are, on a basis of their tie rod effect and the form-locking engagement of their profile rods 46 with the grooves 44, fixed with the segment plates $12_1$ through $12_{10}$ force-form locked oriented positionally correct relative to each other as necessary preliminary to the soldering process.

Figure 5A:
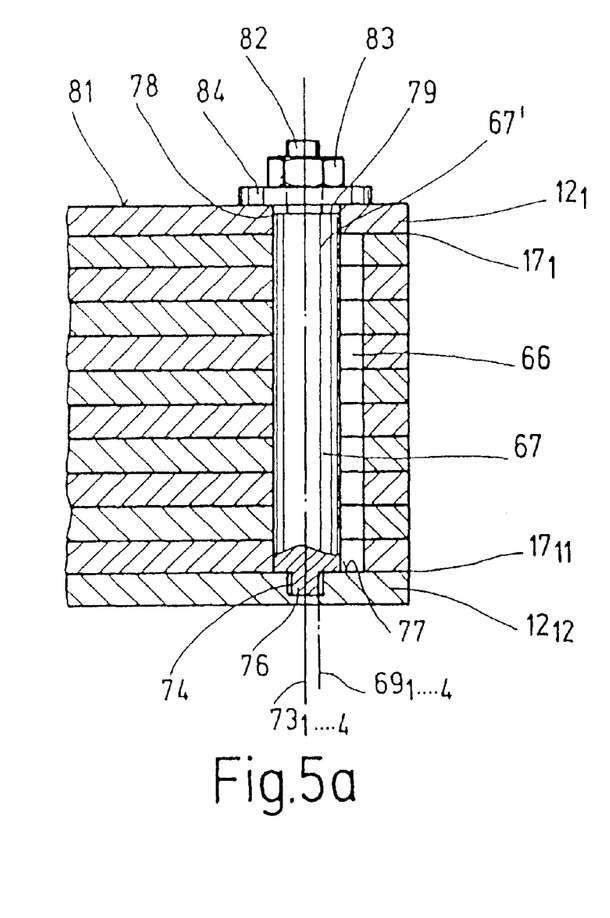
Figure 5B:
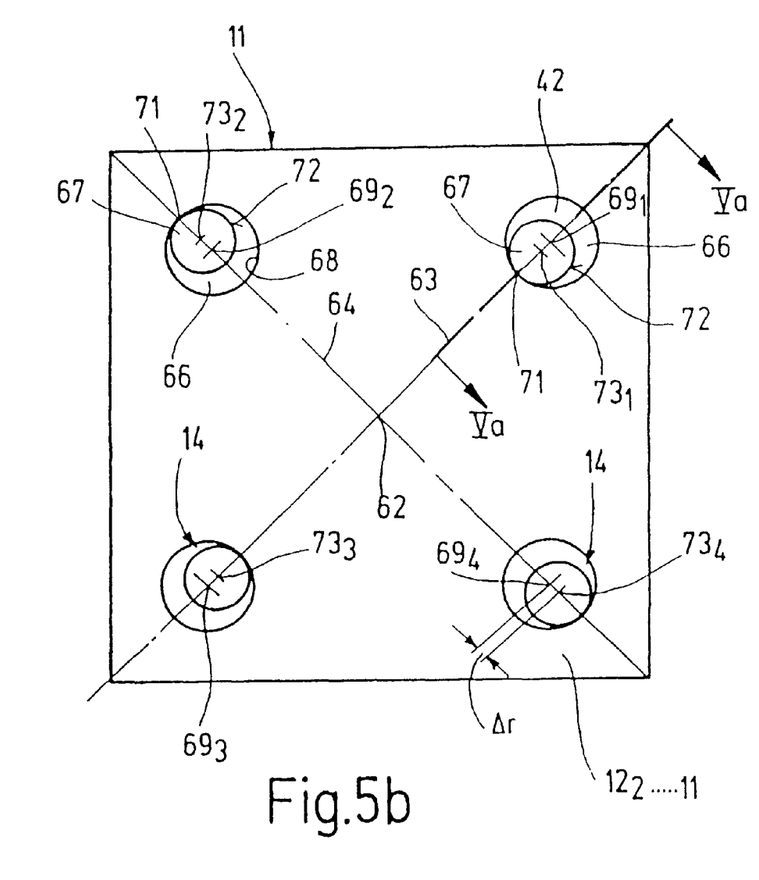

The same applies for the special design of the solder supply paths 14 in the sense represented in FIGS. 5a and 5b, for the explanation of which again reference is made to a design with the basic shape with square segment plates $12_1$ through $12_{12}$ with horizontal orientation of the solder gaps $17_1$ through $17_{11}$ bordered pairwise by the segment plates. It is further presumed that four solder supply paths 14 are provided, which are arranged in axial symmetric grouping relative to the central axis 62 of the stack of plates 11, along which the diagonal planes 63 and 64 of the segment plates $12_1$ through $12_{12}$ intersect or cut. The solder supply paths 14 are formed by respectively one inner channel 66 of round thin cross section and a round steel rod 67 of smaller diameter extending through this channel, which again is used as anchor, by means of which the segment plates $12_1$ through $12_{12}$ are provisionally preliminarily fixed to each other in the desired orientation prior to the solder process. The channel is formed by round voids 68 of the segment plates $12_2$ through $12_{11}$ provided between the uppermost segment plate $12_1$ and the lowermost segment plate $12_{12}$ (FIG. 5a). The central axis $69_1$ through $69_4$ of the channels 66 of the four total solder supply paths lie pairwise in the diagonal planes 63 and 64 of the stack of plates 11. The anchor-steel rods 67 are so provided within the channel 66, that they contact the cylindrical wall respectively along one line 71 running along the cylindrical steel rod outer surface 72, which for its part lies in the diagonal plane 63 or as the case may be 64, that is, the steel rods 67 are so provided within the channel 66 that their central longitudinal axis $73_1$ through $73_4$ are provided with a separation Δr from the central longitudinal axis $69_1$ through $69_4$ seen along the respective diagonal planes 62 or 63, which spacing or distance is the difference of the radius of the round plate voids 68 and the radius of the cylindrical outer surface 72 of the respective tie rods 67. Viewed along the one diagonal plane 63 of the stack of plates 11, the central longitudinal axis $73_1$ and $73_3$ of the tie rods 67 run between the central longitudinal axis $69_1$ and $69_3$ of the diametrically each other opposing arranged solder supply paths 14. By this arrangement of the tie rods 67 within the channels 66 a segment plate 12$_1$ through 12$_{12}$ form-fitting oriented "centered" effect is produced by the anchor rods 67. This centering effect can, as shown for the two solder supply paths 14 provided along the other diagonal plane 64 as shown in FIG. 5b, also be achieved thereby, that the tie rod steel rods 67 are pressed evenly outwards along the diagonal plane 64, that is, the central longitudinal axis 69$_2$ and 69$_4$ of the channels 66 extend between the central longitudinal axis 73$_2$ and 73$_4$ of the tie rods 67.

The channels are closed off on their one lower side according to the representation in FIG. 5a by the lower outer segment plate 12$_{12}$, which together with the segment plate 12$_{11}$ provided immediately thereabove defines the lowermost solder gap 17$_{11}$. The lowermost segment plate 12$_{12}$ has a threaded borehole 74, in which the tie rod 67 can be anchored via an axial threaded segment 76 with positive abutment of its end surface against the inner gap limiting surface 77 of the lowermost segment plate 12$_{12}$. On the upper side, the channel 66 is respectively closed off thereby, that an upper end segment 67' of the tie rod steel rod 67 plugs the channel side of a centering opening 78 of the uppermost segment plate 12$_1$, wherein its upper, ring-shaped end surface 79 is positioned within the centering opening 78, that is, extends up to a small distance, which corresponds to a fragment of the thickness of the upper segment plate 12$_1$, from its outer flush surface 81. The tie rod steel rod 67 is provided on its upper end with a threaded projection 82 coaxial with the central longitudinal axis 73$_i$ (i=1 through 4) upon which for tensioning of the tie rod 67, that is, for pressing together of the stack of plates 11, a tensioning nut 83 can be screwed on, which supports itself via a washer disc 84, which can be in the form of a cup spring or a lock washer, against the outer surface 81 of the uppermost segment plate 12$_1$. In the solder supply paths 14 according to FIGS. 5a and 5b the sickle-shaped void space of the channel 66 extending between the uppermost segment plate 12$_1$ and a lowermost segment plate 12$_2$ of the stack of plates 11, as shown in FIG. 5b, is used as deposit space for round or flat bar shaped solder material 42. The capillary effect necessary for an even solder distribution in the solder gaps 17$_1$ through 17$_{11}$ occurs in the solder supply paths according to FIGS. 5a and 5b in the curved wedge shaped region of the soldered storage space 86, which join each other along the contact line 71 of the tie rod steel rod and the cylindrical wall of the channel 66.

The device 10 represented in FIGS. 6a, 6b and 6c, to the details of which reference will now be made, again uses as starting point essentially for purposes of explanation the stack of segment plates 11 with segment plates 12$_1$ through 12$_n$ defining a horizontal arrangement of the solder gaps 17$_1$ through 17$_{n-1}$ (n=number of the segment plates), which stack is to be joined into a solid block by brazing. For provisional fixing of the stack of plates 11 in the arrangement intended for the soldered block 11' of the segment plates 12$_1$ through 12$_n$ the essentially schematically illustrated tension anchors 86 are provided, which can be realized by means of boreholes of small diameter extending through the segment plates 12$_1$ through 12$_n$ and aligned with each other as well as openings at the outer sides of the outermost segment plates 12$_1$ and 12$_n$ contacting anchor plates 87 and 88 through-going threaded rods 89 and tensioning nuts 91 which can be screwed upon their end segments, which tensioning nuts 91 support themselves against the outer side of the anchor plates 87 and 88.

Within the stack of plates 11 a through-going tubular shaped channel 93 is formed by round openings 92$_1$ through 92$_n$ aligned with each other, of which the central longitudinal axis 94 extends perpendicular to the solder gap defining plate surfaces of the segment plates 12$_1$ through 12$_n$. This channel 93 is closed off at least on its lower side by the there provided anchor plate 87, and for illustrative purposes is also closed off in the illustrated embodiment at its uppermost side by the anchor plate 88, after which the preliminary assembly of the stack of plates 11 has been accomplished.

The channel has a relatively large diameter D of, for example, 15 to 20 mm and is thus suitable as deposit space for a relatively large amount of solder material 42.

In order to form a capillary solder supply path 14, via which the molten solder material, which during melting first collects in the lower part of the channel 93, can climb to the higher lying solder gaps 17$_i$ (i=1 through n−1), there is inserted in the channel 93 a cylindrical, helical spring 96, wound on a block, of which the outer coil diameter is slightly smaller, for example by about 1% smaller, than the diameter D of the channel 93, so that it can be easily inserted therein until contact of its lower end at the lower anchor plate 87. The thickness of the spring wire corresponds, departing from the representation selected for explanation, to only a small fraction of the uniform predetermined plate thicknesses d of the segment plates 12$_1$ through 12$_n$. Their length measured in the direction of the central axis 94 is somewhat smaller than the total cross section of the stack of plates 11, for example by one half of one plate thickness, so that it clearly projects above the uppermost solder gap 17$_1$, when it is seated in the channel 93.

The helical spring 96 experiences, during heating of the stack of plates to the soldering temperature (approximately 1300° K.), a radial widening, whereby its coils 96' lie against the cylindrically shaped wall 93' of the channel 93 along a continuous contact line 97, which corresponds to the course of a thread pitch of a threaded bolt.

Figure 6A:
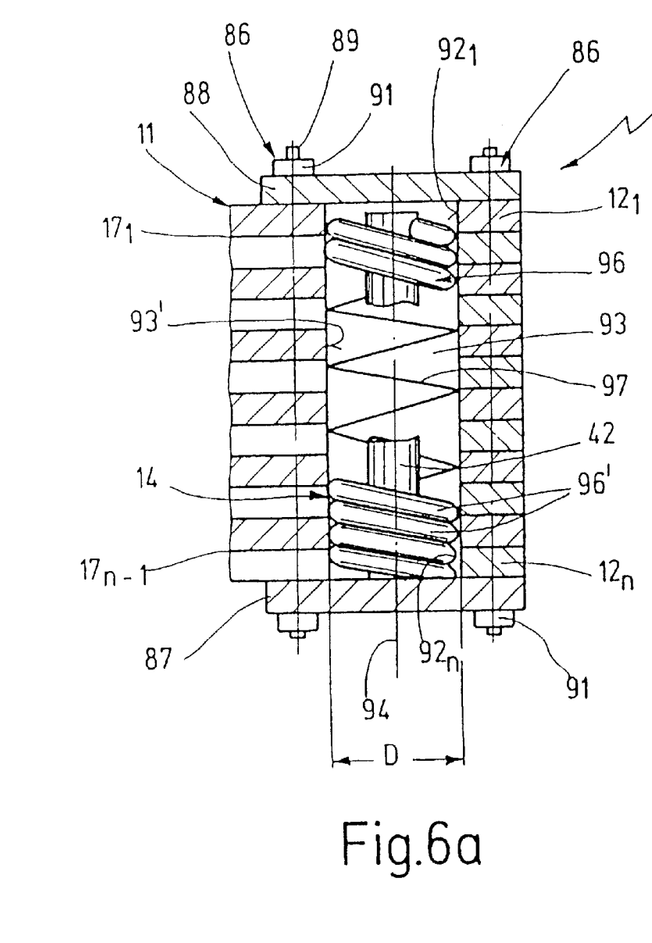

In the solder supply channel 14, which in the sectional representation of FIG. 6a is three pointed, there occurs a sufficiently defined capillary effect, so that molten solder can climb therein even against gravity up to the solder gaps 17$_{n-1}$ to 17$_1$, which draw in molten solder in the required amounts.

Figure 6B:
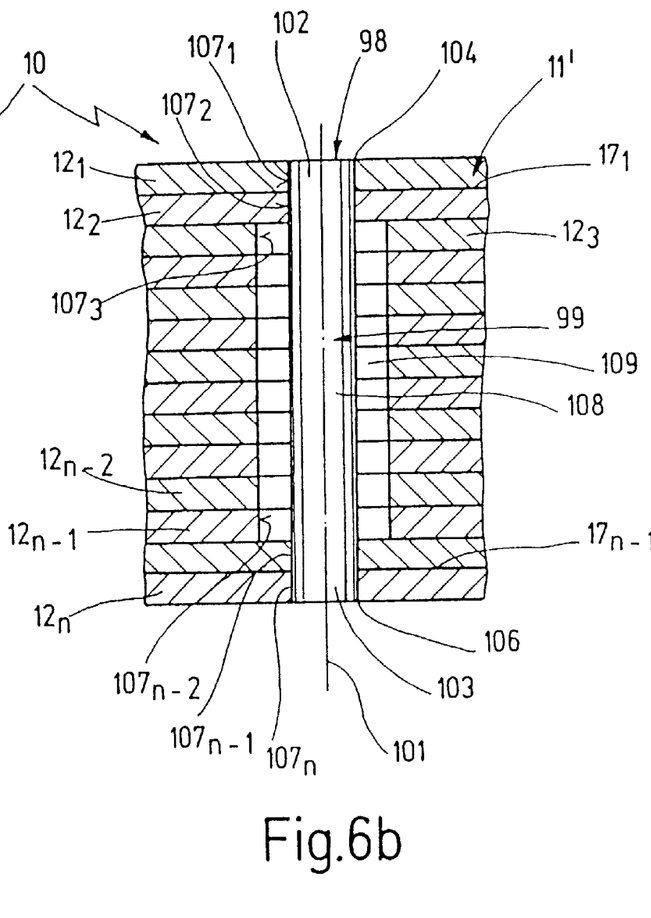

For explanation of possible designs of tie rods 98 by means of which the segment plates 12$_1$ through 12$_n$ of the metal block 11' remain pressed together under tension even after the metal block 11' has been welded, which can prevent any widening of the solder gaps 17$_1$ through 17$_{n-1}$ filled with solder material, which widening could occur for example under the influence of the hydraulic pressure which can be developed within the hydraulic supply channels present inside the metal block 11', reference will now be made to the relevant details of FIG. 6b.

The tie rod 98 is formed by an anchor rod 99, of which the central longitudinal axis 101 extends through the stack of plates 11 perpendicular to the orientation of the planes of the solder gaps 17$_1$ through 17$_{n-1}$ and is solidly welded with its end segments 102 and 103 in the area of the cylinder wall shaped solder space 104 or as the case may be 106 with the two uppermost segment plates 12$_1$ and 12$_2$ as well as with the two lower segment plates 12$_{n-1}$ and 12$_n$ of the stack of plates at the conclusion of the solder process. These cylinder wall shaped solder gaps 104 and 106 are bordered on the side of the block by voids 107$_1$ and 107$_2$ of the uppermost two segment plates 12$_1$ and 12$_2$ or, as the case may be, circular recess 107$_n$ and 107$_{n-1}$ of the two lowermost segment plates 12$_n$ and 12$_{n-1}$, aligned with each other and coaxial to the central longitudinal axis 101, wherein the diameter of these round recesses, except for the—slight— over dimensioning necessary for forming the cylinder wall solder gaps 104 and 106, correspond to that of the anchor rod 99. The solder supply to the cylinder wall shaped solder gaps 104 and 106 occurs via the solder gaps $17_1$ and $17_{n-1}$ defined or bordered by the two uppermost segment plates $12_1$ and $12_2$ or, as the case may be, the two lowermost segment plates $12_{n-1}$ and $12_n$, which are in communication with the capillary solder supply paths 14 of the device 10.

The middle section 108 of the tie rod, which extends between the end segments 102 and 103 of the tie rod 99, which after soldering is rigidly connected with the outer segment plate pairs $12_1$, $12_2$ as well as $12_{n-1}$ and $12_n$, extends through a cylindrical hollow space 109, which is bordered by round, concentric openings $107_3$ through $107_{n-2}$ of segment plates $12_3$ through $12_{n-2}$ aligned with each other relative to the central longitudinal axis 101 and positioned between the segment plates $12_1$ and $12_2$ or as the case may be $12_{n-1}$ and $12_n$ which are rigidly solder connected with the tie rod 99. The narrow diameter of these openings $107_3$ through $107_{n}$ of the "intermediate"—segment plates $12_3$ through $12_{n-2}$ is significant, that is, at least 2 to 3 mm larger than the diameter of the tie rod 99, so that no capillary effect occurs between this and the wall of the hollow space 109 defined by the ring cylindrical voids $107_3$ through $107_{n-2}$, which could lead to a rigid connection of the anchor rod 99 with the "intermediate" segment plates $12_3$ through $12_{n-2}$.

The tie rod 99 is comprised of a material, of which the thermal coefficient of expansion α is significantly larger than that of the steel—material, of which the segment plates $12_1$ through $12_n$ are comprised. Under the presumption that this is made of a conventional steel with a carbon content of 1%, then for the tie rod 99 again a conventional stainless steel material would be suitable, which has a thermal coefficient of expansion which is approximately 1.5 times larger than that of the steel material.

The anchor rod 99 is so dimensioned, and is so provided within the stack of plates 11, that during the solder process, that is, when the stack of plates 11 is heated to solder temperature of for example 1000° C., it extends with its diameter through respective openings $107_1$, $107_2$ of the upper each other adjacent segment plates $12_1$ and $12_2$ as well as the openings $107_{n-1}$ and $107_n$ of the lower two segment plates $12_{n-1}$ and $12_n$ over their entire breadth. As soon as the temperature drops below the solder temperature above which the solder material becomes molten, the anchor rod 99 is respectively rigidly connected on its length corresponding to the double thickness of the segment plates of the end segments 102 and 103 with the two uppermost segment plates $12_1$ and $12_2$ as well as the two lowermost segment plates $12_{n-1}$ and $12_n$. After this bonding is achieved by the cooling of the solidly soldered metal block 11', then the anchor rod 99 during further cooling experiences an axial pre-tensioning, since its tendency to shorten is stronger than that of the material of the segment plates $12_1$ through $12_n$. On a basis of its elasticity it acts as a strong pre-tensioned spring, which holds the segment plates $12_1$ through $12_n$ together.

The basic concept for realizing a tie rod explained on the basis of FIG. 6b can be naturally be modified in many ways, in particular also in the manner that the tensioning tie rod effect is only effective between the outermost segment plates $12_1$ and $12_n$.

Figure 6C:
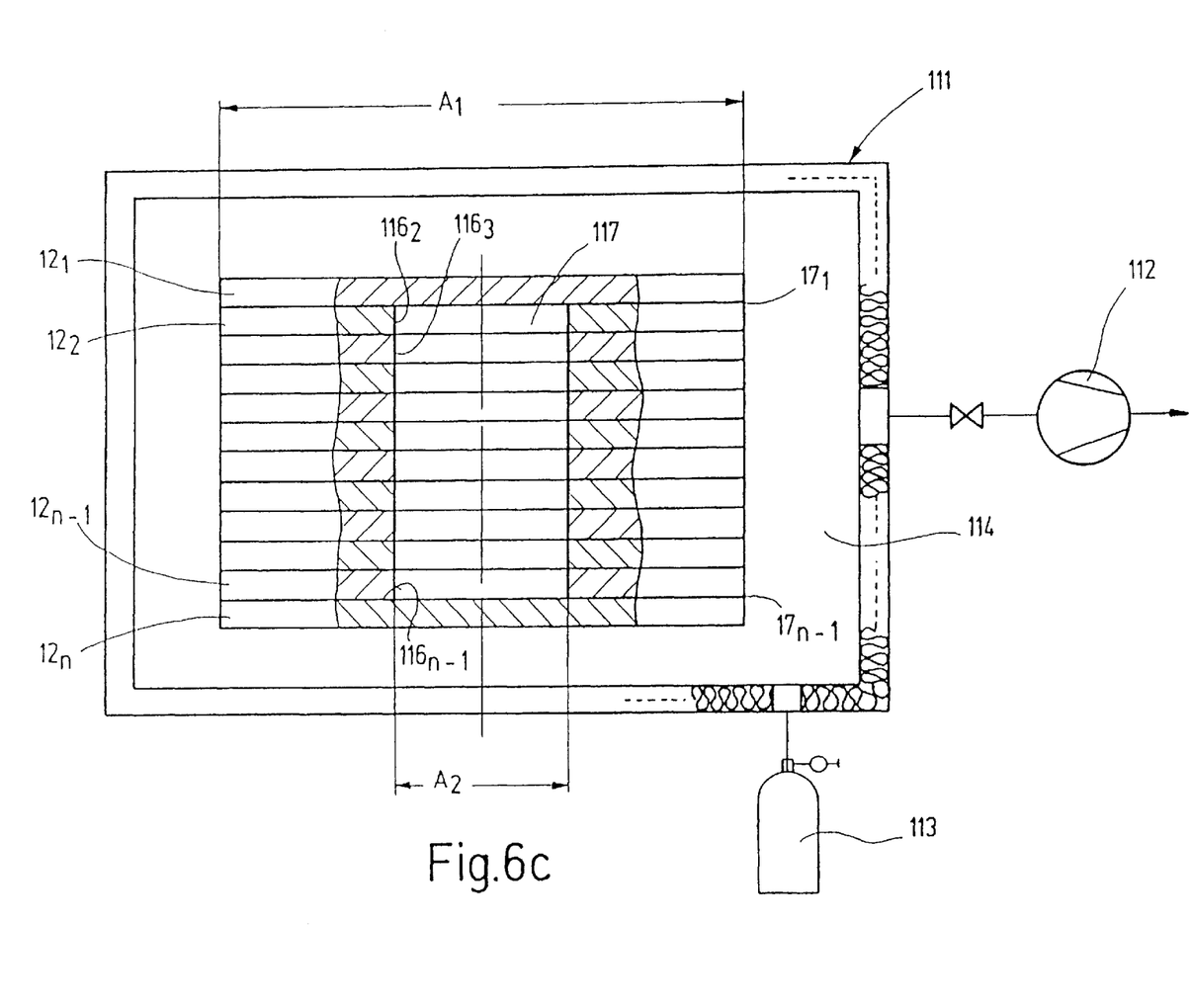

For the design of the stack of plates 11 according to FIG. 6c it is a precondition that the solder process occurs in an essentially schematically indicated solder oven 111, which in preparation for the solder process can be evacuated using a vacuum pump 112 and during the solder process can be placed under an elevated pressure of for example 6 bar by introduction of a non-combustible gas, for example noble gas, from a high pressure supply container 113 into the treatment space 114 containing the stack of plates 11.

Within the stack of plates 11 cylindrical hollow spaces 117 are formed in the illustrated example by aligned voids $116_2$ through $116_{n-1}$ of the segment plates $12_2$ through $12_{n-1}$, which are provided between the outermost segment plates $12_1$ and $12_n$, in which the closed round hollow spaces 117 are preferably evenly distributed over the basic surface of the stack of plates 11. The dimensioning or sizing of these hollow spaces is determined in the case of the typical design, based upon the total base surface A1 of the stack of plates 11, which is presumed to be square or rectangular, which corresponds to the sum of the cross section surfaces A2 of the hollow spaces 117, corresponds to approximately ⅛ through ¼ of the base surface A1.

In FIG. 6d for simplicity only one of these hollow spaces 117 is represented. The solder supply for the individual solder gaps is achieved by one of the embodiments discussed for FIGS. 1 through 6a. For soldering the segment plate stack 11 to a unitary metal block 11' a procedure according to the following preferred process is carried out:

During the heating of the segment plate stack the treatment space 114 of the oven or as the case may be the internal space of a pressure chamber, in which the oven 111 is positioned, is evacuated. Thereby also the "closed" hollow spaces 117 of the segment stack plate 11 which are in communication with the treatment space 114 via the still solder-free solder gaps $17_1$ through $17_{n-1}$ are evacuated. As soon as the solder material melts and the solder gaps $17_1$ through $17_{n-1}$, draw in solder and thereby become completely filled, the closed hollow spaces 117 are hermetically sealed against the treatment space 114, whereby the vacuum within the hollow space 117 is maintained. While the solder material is still molten the treatment space 114 is placed under an elevated gas pressure of for example 6 bar, which on the basis of the pressure differential between the treatment space 114 and the extremely low pressure existing in the internals of the closed hollow spaces 117 leads to forces which press the segment plate stack 11 together in the sense of a narrowing of the width of the solder gaps $17_1$ through $17_{n-1}$. A qualitative exuding of the molten solder material out of the solder gaps $17_1$ through $17_{n-1}$ into the hollow spaces 117 is not cause for concern since the capillary force active in the region of the solder gaps $17_1$ holds the molten solder in the solder gaps $17_1$ through $17_{n-1}$ even in the face of the higher outer pressure in a treatment space 114 at least in the context that the large surface wetted of the opposing plate surfaces remains in effect and in any case so much molten solder is introduced in the hollow space 117 as can be pressed out of the solder gaps $17_1$ through $17_{n-1}$ by the pressing together of the segment plates. The elevated pressure in the treatment space is maintained for several minutes, for example 5 to 10 minutes, in any case for a sufficient time, after which, in accordance with experience, a desired minimization of the solder layer thickness in the solder gaps $17_1$ through $17_{n-1}$ can be presumed. By the introduction of inert gas under elevated pressure the cooling process is started, wherein the elevated internal pressure is preferably maintained for a sufficient time until the solder material is quantitatively solidified.

What is claimed is:

1. A device for the integral joining of a metal block made up of a plurality of plates, by brazing, wherein the braze provides a large surface area, minimal thickness connection in solder gaps ($17_j$; j=1, 2, . . . , n−1) located between adjacent segment plates ($12_i$; i=1, 2, . . . , n), wherein at least one capillary solder inflow path (14) is provided starting at a solder depot, the solder depot containing a supply of braze material (42), which solder melts as the stack (11) of plates is heated, such that the melted solder material flows directly into the individual capillary solder gaps ($17_j$; j=1, 2, . . . , n−1) formed between the facing surfaces of the segment plates ($12_i$) via said solder inflow path, wherein the capillary supply path is provided along an external surface of the stack of plates intended to form the metal block (11'), in which the outer narrow surfaces of the segment plates, which lie with large surfaces against each other, are coplanar.

2. A device for the integral joining of a metal block made up of a plurality of plates, by brazing, wherein the braze provides a large surface area, minimal thickness connection in solder gaps ($17_j$; j=1, 2, . . . , n−1) located between adjacent segment plates ($12_i$; i=1, 2, . . . , n), wherein at least one capillary solder inflow path (14) is provided starting at a solder depot, the solder depot containing a supply of braze material (42), which solder melts as the stack (11) of plates is heated, such that the melted solder material flows directly into the individual capillary solder gaps ($17_j$; j=1, 2, . . . , n−1) formed between the facing surfaces of the segment plates ($12_i$) via said solder inflow path, wherein the capillary solder flow path (14) is defined by a profile element lying against the outer surface of the metal block (11'), which traverses the solder gaps of the metal block.

3. A device according to claim 2, wherein the profile rod (16) forms an outer boundary for the solder depository space.

4. A device according to claim 2, wherein the segment plates ($12_i$) are provided with edge-open recesses (13), of which the edge surfaces running perpendicular to the solder gaps ($17_j$) align with each other and form a groove (13') crossing over the solder gaps, and that a profile rod (16) is introduced into the groove, defines within the groove at least one acute narrowing closed-edged channel and is held in contact with the groove wall along at least one line crossing the solder gap ($17_j$).

5. A device according to claim 4, wherein the profile rod (46) seated in the groove has at least one section in shape of a cylindrical rod, which is in contact with at least one surface of a planar or slightly curved surface defining the groove.

6. A device according to claim 5, wherein the profile rod (46) is configured as a cylindrical rod or an externally cylindrical pipe, of which the outer surface contacts the groove along two linear or slightly curved outer surface lines (52, 53).

7. A device according to claim 4, wherein the groove (44) has a planar groove base (51) and groove flanks extending perpendicularly thereto, that the profile rod (46) introduced therein has the shape of a cylinder over at least 180° of its outer circumference, which with the crown or apex of its curved segment is provided in the groove oriented towards the groove base, and that the depth of the groove measured perpendicular to the groove base corresponds at least to the diameter of the radius of curvature of the rod introduced in the groove.

8. A device according to claim 2, wherein the groove (44) has a planar groove base (51) and groove flanks extending perpendicularly thereto, that the profile rod (46) introduced therein has the shape of a cylinder over at least 180° of its outer circumference, which with the crown or apex of its curved segment is provided in the groove oriented towards the groove base, and that the depth of the groove measured perpendicular to the groove base corresponds at least to the diameter of the radius of curvature of the rod introduced in the groove and has a value which is between twice the radius of curvature and the four fold value of the curvature radius.

9. A device according to claim 4, wherein the groove (13') has the basic shape of a flat thin rectangle, wherein the depth of the groove measured at the edge areas (37) of the groove base (21) perpendicular to the groove base is significantly smaller than the width w measured between the groove flanks (22), and that the profile rod (16) inserted therein is slightly curved.

10. A device according to claim 9, wherein the profile rod is punched or materially joined to the groove.

11. A device according to claim 9, wherein the profile rod (16) which has the shape of a flat curved segment of a pipe or cylinder outer surface extending over an arc of 15 to 20°, of which the longitudinal edges (23) extend parallel to each other, wherein the breadth of the profile rod measured along the longitudinal edges corresponds to the width w of the groove.

12. A device according to claim 9, wherein a solder deposit space is formed by a central further deepening recess (43) in the groove, which is bridged over by the profile rod (16).

13. A device for the integral joining of a metal block made up of a plurality of plates, by brazing, wherein the braze provides a large surface area, minimal thickness connection in solder gaps ($17_j$; j=1, 2, . . . , n−1) located between adjacent segment plates ($12_i$; i=1, 2, . . . , n), wherein at least one capillary solder inflow path (14) is provided starting at a solder depot, the solder depot containing a supply of braze material (42), which solder melts as the stack (11) of plates is heated, such that the melted solder material flows directly into the individual capillary solder gaps ($17_j$; j=1, 2, . . . , n−1) formed between the facing surfaces of the segment plates ($12_i$) via said solder inflow path, wherein the solder supply path (14) is formed by aligned, closed edged, and a profile rod (67) extending therethrough, which has a shape which is geometrically analogous to the openings and a size which is slightly smaller, and which is in linear contact with the opening edges.

14. A device according to claim 13, wherein at least two solder supply paths in an arrangement fixing the segment plates in a defined—centered—position.

15. A device according to claim 13, wherein the solder supply path (14) has round openings (68) of the segment plates ($12_i$).

16. A device for the integral joining of a metal block made up of a plurality of plates, by brazing, wherein the braze provides a large surface area, minimal thickness connection in solder gaps ($17_j$; j=1, 2, . . . , n−1) located between adjacent segment plates ($12_i$; i=1, 2, . . . , n), wherein at least one capillary solder inflow path (14) is provided starting at a solder depot, the solder depot containing a supply of braze material (42), which solder melts as the stack (11) of plates is heated, such that the melted solder material flows directly into the individual capillary solder gaps ($17_j$; j=1, 2, . . . , n−1) formed between the facing surfaces of the segment plates ($12_i$) via said solder inflow path, wherein at least one solder supply path (14) is provided, formed by aligned, circular edged openings ($92_i$) of the segment plates ($12_i$) and a helical coil (96) extending through the channel (93) formed by the openings, of which the helical coil is in continuous contact with the collective opening edges.

17. A device according to claim 16, wherein the helical coil is wound on a core.

18. A device for the integral joining of a metal block made up of a plurality of plates, by brazing, wherein the braze provides a large surface area, minimal thickness connection in solder gaps ($17_j$; j=1, 2, . . . , n−1) located between adjacent segment plates ($12_i$; i=1, 2, . . . , n), wherein at least one capillary solder inflow path (14) is provided starting at a solder depot, the solder depot containing a supply of braze material (42), which solder melts as the stack (11) of plates is heated, such that the melted solder material flows directly into the individual capillary solder gaps ($17_j$; j=1, 2, . . . , n−1) formed between the facing surfaces of the segment plates ($12_i$) via said solder inflow path, wherein for the formation of a solder capillary supply path (14) in the edge area of the stack of plates there are provided slits (127) which extend beginning at the plate openings (122) which define a channel shaped solder depository (126) and extend in close proximity to a plate outer edge (123), running parallel to the plate outer edge (123) and extending to another outer edge (124) of the plate, such that these slits (127) are bordered on one side by thin walled tongue elements (131) of the segment plates, and that these tongue elements (131) are bent such that they are flush against the oppositely lying slit flank (129).

19. A device according to claim 18, wherein the plates ($12_i$) are comprised of a steel with a thermal coefficient of expansion of about $10\times10^{-6}$/K and that the rod (99) is comprised of a stainless steel with a thermal coefficient of expansion of about $15\times10^{-6}$/K.

20. A device for the integral joining of a metal block made up of a plurality of plates, by brazing, wherein the braze provides a large surface area, minimal thickness connection in solder gaps ($17_j$; j=1, 2, . . . , n−1) located between adjacent segment plates ($12_i$; i=1, 2, . . . , n), wherein at least one capillary solder inflow path (14) is provided starting at a solder depot, the solder depot containing a supply of braze material (42), which solder melts as the stack (11) of plates is heated, such that the melted solder material flows directly into the individual capillary solder gaps ($17_j$; j=1, 2, . . . , n−1) formed between the facing surfaces of the segment plates ($12_i$) via said solder inflow path, wherein by at least one tie rod, comprising an anchor rod (99) rigidly soldered to the end plates of a metal block (11'), between which end plates a plurality of intermediate plates are provided, which anchor rod extends through openings ($107_i$) running through the segment plates ($12_2$ to $12_{n-1}$), wherein between the edges of the openings and the anchor rod a significantly greater gap exists, which is so dimensioned, that a soldering of the rod to the opening edges is precluded, and wherein the anchor rod is comprised of a material of which the thermal coefficient of expansion is significantly greater than that of the respective segment plates.

21. A device according to claim 20, wherein the openings ($107_i$) through which the anchor rod (99) extends are coaxial relative to the central axis (101) of the rod, wherein the gap width between the rod and the edges of the openings is at least 0.2 mm.

22. A device according to claim 20, wherein the openings ($107_i$) through which the anchor rod (99) extends are coaxial relative to the central axis (101) of the rod, wherein the gap width between the rod and the edges of the openings is between 1 mm and 2 mm.

23. A process for the material joining of a metal block comprised of segment plates by brazing in a soldering oven adapted for soldering under vacuum and under inert gas, wherein at least during the soldering process a force is exerted upon the stack pressing the stack together, which has the effect of narrowing the width of soldering gaps which produce the material joining of the plates by their filling with solder, characterized by the following characteristics:

a) the segment plates ($12_2$ and $12_{n-1}$) provided between the outermost segment plates ($12_1$ and $12_n$) are provided with openings, which define within the stack of plates a hollow space or a plurality of hollow spaces distributed evenly about the cross section of the stack of plates, which hollow space(s) extend between the intermediate plates of the stack, wherein the cross-sectional areas of the plate openings, relative to that of the segment plates, correspond to a significant fraction of the plate surface area, for example, 1/10 to 3/10;

b) after the solder is melted, the stack of plates is subjected to pressurized inert gas, which is significantly higher, e.g., by 1 to 10 bar higher, than the pressure at which the solder was drawn into the solder gaps ($17_j$); and c) the elevated pressure is maintained for so long, until the solder has solidified in the cooling phase of the soldering process.

24. Process according to claim 23, wherein the soldering oven is under vacuum at least during the melting phase of the braze material.

* * * * *